United States Patent
Ori

(10) Patent No.: US 7,667,899 B2
(45) Date of Patent: Feb. 23, 2010

(54) ZOOM LENS SYSTEM AND IMAGING APPARATUS

(75) Inventor: Tetsuya Ori, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 12/413,106

(22) Filed: Mar. 27, 2009

(65) Prior Publication Data

US 2009/0273846 A1 Nov. 5, 2009

(30) Foreign Application Priority Data

Apr. 30, 2008 (JP) ............................ P2008-119022

(51) Int. Cl.
*G02B 15/14* (2006.01)

(52) U.S. Cl. ..................................... 359/687

(58) Field of Classification Search ................. 359/676, 359/683, 687

See application file for complete search history.

(56) References Cited

U.S. PATENT DOCUMENTS

| | | | |
|---|---|---|---|
| 6,633,437 B1 | 10/2003 | Hoshi et al. | |
| 7,304,803 B2 * | 12/2007 | Ohashi | 359/686 |
| 7,420,745 B2 * | 9/2008 | Ohashi | 359/687 |
| 2005/0168832 A1 | 8/2005 | Hamano | |
| 2006/0132928 A1 * | 6/2006 | Nakatani et al. | 359/687 |
| 2006/0193062 A1 | 8/2006 | Ohashi | |

FOREIGN PATENT DOCUMENTS

| | | |
|---|---|---|
| JP | 3392881 B2 | 3/2003 |
| JP | 2005-215385 A | 8/2005 |
| JP | 3706783 B2 | 10/2005 |
| JP | 2006-235062 A | 9/2006 |

* cited by examiner

*Primary Examiner*—Scott J Sugarman
(74) *Attorney, Agent, or Firm*—Birch, Stewart, Kolasch & Birch, LLP

(57) ABSTRACT

A positive first lens group G1, a negative second lens group G2, an aperture diaphragm St, a positive third lens group G3, and a positive fourth lens group G4 are sequentially arranged, and a movement of the lens groups and the aperture diaphragm St during zooming is optimized in combination with an appropriate conditional expression. During zooming, a position of the aperture diaphragm St on an optical axis at a wide-angle end is closer to an image plane than that at a telephoto end, and a space on the optical axis at the wide-angle end between the aperture diaphragm St and the third lens group G3 is larger than that at the telephoto end, thereby suppressing the length of the whole lens. Also, heights of rays passing through the first lens group G1 are lowered, thereby suppressing the lens diameter of the first lens group G1.

14 Claims, 19 Drawing Sheets

| | Example 1 Basic Lens Data | | | | |
|---|---|---|---|---|---|
| | Si (Surface Number) | Ri (Radius of curvature) | Di (Surface separation) | Ndi (refractive index) | $\nu dj$ (Abbe number) |
| G1 | 1 | 40.3831 | 0.85 | 1.92286 | 18.9 |
| | 2 | 25.0070 | 2.74 | 1.62041 | 60.3 |
| | 3 | 299.9996 | 0.10 | 1.00000 | |
| | 4 | 19.7623 | 2.35 | 1.75500 | 52.3 |
| | 5 | 57.6875 | D5 (variable) | 1.00000 | |
| G2 | 6 | 59.1417 | 0.60 | 1.88300 | 40.8 |
| | 7 | 4.9972 | 2.35 | 1.00000 | |
| | 8 | −22.5393 | 0.55 | 1.88300 | 40.8 |
| | 9 | 16.5182 | 0.10 | 1.00000 | |
| | 10 | 10.1194 | 1.85 | 1.92286 | 18.9 |
| | 11 | −612.7279 | D11 (variable) | 1.00000 | |
| | 12 (AD) | — | D12 (variable) | 1.00000 | |
| G3 | 13 | 6.3804 | 4.20 | 1.74320 | 49.3 |
| | 14 | −13.6050 | 0.50 | 1.84666 | 23.8 |
| | 15 | 11.7285 | 0.25 | 1.00000 | |
| | *16 | 27.7195 | 1.30 | 1.69350 | 53.2 |
| | *17 | −43.6602 | D17 (variable) | 1.00000 | |
| G4 | *18 | 22.2303 | 2.23 | 1.51760 | 63.5 |
| | *19 | −121.0395 | D19 (variable) | 1.00000 | |
| | 20 | ∞ | 0.80 | 1.51680 | 64.2 |
| | 21 | ∞ | | 1.00000 | |

(*: Aspherical, AD: Aperture Diaphragm)
(f=6.27~42.18mm, FNO.=3.25~5.82, 2ω=79.4° ~13.4°)

(B)

| | Example 1 Variable Surface Separation Data | | |
|---|---|---|---|
| Surface separation | Wide end (f=6.27) | Intermediate (f=16.27) | Telephoto end (f=42.18) |
| D5 | 0.28 | 6.19 | 14.46 |
| D11 | 8.36 | 4.83 | 1.68 |
| D12 | 4.40 | 0.40 | 0.40 |
| D17 | 4.62 | 9.11 | 16.80 |
| D19 | 7.30 | 10.24 | 4.03 |

FIG. 6

| Example 1 Aspheric Surface Data |||||
|---|---|---|---|---|
| SN | Coefficients ||||
| | K | A3 | A4 | A5 | A6 |
| 16 | -9.448494E+00 | -1.504612E-04 | 2.142883E-04 | 1.161437E-04 | -9.679118E-05 |
| 17 | -3.931179E-01 | -2.974667E-04 | 1.534253E-03 | -3.495217E-05 | -1.911829E-05 |
| 18 | 8.469056E+00 | -2.008631E-03 | 8.986016E-04 | -1.927126E-04 | -1.044052E-05 |
| 19 | 9.998229E+00 | -1.793370E-03 | 6.843561E-04 | -1.258464E-04 | -8.179924E-06 |
| | A7 | A8 | A9 | A10 | A11 |
| 16 | 2.033066E-05 | 4.465950E-06 | -1.430026E-06 | 1.399967E-07 | 1.829925E-08 |
| 17 | 1.796002E-05 | 8.245952E-06 | -1.717940E-08 | -5.113501E-07 | -1.299088E-07 |
| 18 | 1.772652E-06 | 8.580799E-07 | 6.787402E-08 | -2.529155E-08 | -1.571562E-09 |
| 19 | -1.037111E-06 | 7.246565E-07 | 9.002807E-08 | -4.106192E-09 | -1.491828E-09 |
| | A12 | A13 | A14 | A15 | A16 |
| 16 | 1.893674E-08 | 2.438506E-09 | -1.356916E-09 | -1.920981E-10 | -4.984571E-12 |
| 17 | 2.648125E-08 | 1.405191E-09 | 3.850520E-09 | 4.175114E-10 | 7.547952E-11 |
| 18 | -1.052709E-10 | -2.738347E-11 | -2.544440E-12 | 4.846846E-14 | 1.768775E-13 |
| 19 | -4.153060E-10 | -7.286784E-11 | -4.380896E-12 | 5.971776E-13 | 3.071973E-13 |
| | A17 | A18 | A19 | A20 | |
| 16 | 1.285558E-11 | -1.293554E-11 | 3.278881E-12 | -1.598645E-13 | |
| 17 | -4.585778E-11 | -5.344795E-12 | -5.786889E-12 | 1.092529E-12 | |
| 18 | 6.157122E-14 | 1.322182E-14 | 1.065975E-16 | -4.790576E-16 | |
| 19 | 5.876589E-14 | 1.031940E-14 | 3.079572E-16 | -4.386882E-16 | |

SN: Surface Number

| | Example 2 Basic Lens Data | | | | |
|---|---|---|---|---|---|
| | Si (Surface Number) | Ri (Radius of curvature) | Di (Surface separation) | Ndi (refractive index) | νdj (Abbe number) |
| G1 | 1 | 42.4821 | 0.85 | 1.92286 | 18.9 |
| | 2 | 26.2981 | 2.66 | 1.62041 | 60.3 |
| | 3 | 299.9996 | 0.10 | 1.00000 | |
| | 4 | 19.8277 | 2.35 | 1.75500 | 52.3 |
| | 5 | 53.4239 | D5 (variable) | 1.00000 | |
| G2 | 6 | 50.1293 | 0.60 | 1.88300 | 40.8 |
| | 7 | 5.0780 | 2.40 | 1.00000 | |
| | 8 | −15.0349 | 0.55 | 1.83481 | 42.7 |
| | 9 | 20.7856 | 0.10 | 1.00000 | |
| | 10 | 11.9150 | 1.85 | 1.92286 | 20.9 |
| | 11 | −48.7561 | D11 (variable) | 1.00000 | |
| | 12 (AD) | — | D12 (variable) | 1.00000 | |
| G3 | 13 | 7.0000 | 4.10 | 1.83400 | 37.2 |
| | 14 | −10.8626 | 0.50 | 1.92286 | 20.9 |
| | 15 | 12.4813 | 0.15 | 1.00000 | |
| | *16 | 21.4761 | 1.30 | 1.69350 | 53.2 |
| | *17 | −265.7374 | D17 (variable) | 1.00000 | |
| G4 | *18 | 21.5296 | 2.20 | 1.51760 | 63.5 |
| | *19 | −56.0985 | D19 (variable) | 1.00000 | |
| | 20 | ∞ | 1.05 | 1.51680 | 64.2 |
| | 21 | ∞ | | 1.00000 | |

(*: Aspherical, AD: Aperture Diaphragm)
(f=6.29~42.34mm, FNO.=3.25~5.85, 2ω=79.4° ~12.4°)

(B)

| Example 2 Variable Surface Separation Data | | | |
|---|---|---|---|
| Surface separation | Wide end (f=6.29) | Intermediate (f=16.33) | Telephoto end (f=42.34) |
| D5 | 0.29 | 7.25 | 15.36 |
| D11 | 8.41 | 4.71 | 1.51 |
| D12 | 4.40 | 0.40 | 0.40 |
| D17 | 4.50 | 8.72 | 17.15 |
| D19 | 7.23 | 9.68 | 3.32 |

FIG. 8

| Example 2·Aspheric Surface Data | | | | | |
|---|---|---|---|---|---|
| SN | Coefficients | | | | |
| | K | A3 | A4 | A5 | A6 |
| 16 | 9.352831E+00 | -1.710714E-05 | 9.640167E-04 | 1.661205E-04 | -6.885196E-05 |
| 17 | -9.987418E+00 | -1.645293E-04 | 2.295457E-03 | 1.002103E-04 | -2.165194E-05 |
| 18 | 6.005675E+00 | -2.314955E-03 | 8.331672E-04 | -1.791766E-04 | -8.710684E-06 |
| 19 | 2.799959E+00 | -2.114883E-03 | 6.086275E-04 | -1.275245E-04 | -3.344245E-06 |
| | A7 | A8 | A9 | A10 | A11 |
| 16 | 1.921223E-05 | 4.886998E-06 | -1.602727E-06 | 2.734277E-08 | 1.503319E-08 |
| 17 | 2.441082E-05 | 5.957001E-06 | 6.974234E-07 | -4.797936E-07 | -1.806113E-07 |
| 18 | 2.308299E-06 | 7.446637E-07 | 4.867250E-08 | -2.791875E-08 | -1.906726E-09 |
| 19 | -8.548271E-07 | 6.006127E-07 | 8.103872E-08 | -5.556605E-09 | -1.259479E-09 |
| | A12 | A13 | A14 | A15 | A16 |
| 16 | 4.205174E-09 | 1.654782E-10 | -6.639900E-10 | -1.708729E-10 | 2.623669E-11 |
| 17 | 7.691051E-09 | 1.839677E-10 | 4.566359E-09 | 5.312148E-10 | 8.611717E-11 |
| 18 | -3.611848E-11 | -1.210939E-11 | -7.814998E-13 | 1.014785E-13 | 1.988978E-13 |
| 19 | -4.685796E-10 | -8.285986E-11 | -4.065212E-12 | 7.507390E-13 | 4.449099E-13 |
| | A17 | A18 | A19 | A20 | |
| 16 | 1.874721E-11 | 4.040759E-12 | -5.547928E-13 | -3.094555E-13 | |
| 17 | -3.811587E-11 | -7.034986E-12 | -6.070750E-12 | 1.109642E-12 | |
| 18 | 6.380702E-14 | 1.513702E-14 | -2.951245E-18 | -5.991161E-16 | |
| 19 | 8.816173E-14 | 8.846674E-15 | -1.012934E-16 | -5.343037E-16 | |

SN: Surface Number

| | Example 3 Basic Lens Data | | | | |
|---|---|---|---|---|---|
| | Si (Surface Number) | Ri (Radius of curvature) | Di (Surface separation) | Ndi (refractive index) | νdj (Abbe number) |
| G1 | 1 | 40.9258 | 0.85 | 1.92286 | 18.9 |
| | 2 | 25.0000 | 2.66 | 1.62041 | 60.3 |
| | 3 | 300.0023 | 0.10 | 1.00000 | |
| | 4 | 19.1600 | 2.35 | 1.75500 | 52.3 |
| | 5 | 50.6805 | D5 (variable) | 1.00000 | |
| G2 | 6 | 48.4303 | 0.60 | 1.88300 | 40.8 |
| | 7 | 4.8220 | 2.24 | 1.00000 | |
| | 8 | −25.0098 | 0.55 | 1.88300 | 40.8 |
| | 9 | 15.7030 | 0.10 | 1.00000 | |
| | 10 | 9.5168 | 1.85 | 1.92286 | 18.9 |
| | 11 | 286.7401 | D11 (variable) | 1.00000 | |
| | 12 (AD) | — | D12 (variable) | 1.00000 | |
| G3 | 13 | 7.0000 | 3.97 | 1.83400 | 37.2 |
| | 14 | −10.8461 | 0.50 | 1.92286 | 20.9 |
| | 15 | 12.6805 | 0.17 | 1.00000 | |
| | *16 | 37.7128 | 1.30 | 1.69350 | 53.2 |
| | *17 | −30.7190 | D17 (variable) | 1.00000 | |
| G4 | *18 | 23.8687 | 2.24 | 1.51760 | 63.5 |
| | *19 | −61.6979 | D19 (variable) | 1.00000 | |
| | 20 | ∞ | 1.05 | 1.51680 | 64.2 |
| | 21 | ∞ | | 1.00000 | |

(*: Aspherical, AD: Aperture Diaphragm)
(f=6.28~42.29mm, FNO.=3.22~5.73, 2ω=79.4° ~12.4°)

(B)

| Example 3 Variable Surface Separation Data | | | |
|---|---|---|---|
| Surface separation | Wide end (f=6.28) | Intermediate (f=16.31) | Telephoto end (f=42.29) |
| D5 | 0.29 | 7.25 | 15.36 |
| D11 | 8.41 | 4.71 | 1.51 |
| D12 | 4.40 | 0.40 | 0.40 |
| D17 | 4.50 | 8.72 | 17.15 |
| D19 | 7.23 | 9.68 | 3.32 |

FIG. 10

| Example 3 Aspheric Surface Data | | | | | |
|---|---|---|---|---|---|
| SN | Coefficients | | | | |
| | K | A3 | A4 | A5 | A6 |
| 16 | -8.663938E+00 | -7.501004E-05 | 7.839768E-04 | 1.226992E-04 | -7.326621E-05 |
| 17 | -9.993304E+00 | -1.742462E-04 | 1.764448E-03 | 7.920049E-05 | -2.963308E-05 |
| 18 | 5.131846E+00 | -2.184655E-03 | 8.863563E-04 | -1.763207E-04 | -9.944448E-06 |
| 19 | 3.548188E-01 | -2.113952E-03 | 7.515975E-04 | -1.507332E-04 | -4.928529E-06 |
| | A7 | A8 | A9 | A10 | A11 |
| 16 | 2.699689E-05 | 5.741472E-06 | -1.471262E-06 | -1.724203E-10 | 5.379712E-09 |
| 17 | 2.318028E-05 | 9.310623E-06 | 3.850135E-07 | -6.148150E-07 | -1.581435E-07 |
| 18 | 1.475133E-06 | 7.710329E-07 | 6.102815E-08 | -2.544033E-08 | -1.465074E-09 |
| 19 | -4.468091E-07 | 6.213188E-07 | 6.241443E-08 | -7.438123E-09 | -1.493925E-09 |
| | A12 | A13 | A14 | A15 | A16 |
| 16 | 2.674695E-09 | 8.068782E-10 | -6.344819E-10 | -1.844998E-11 | 2.298812E-12 |
| 17 | 1.990824E-08 | 1.583116E-09 | 3.754078E-09 | 4.679092E-10 | 7.425682E-11 |
| 18 | -6.337495E-11 | -1.616242E-11 | -3.853312E-13 | 3.696877E-13 | 2.016677E-13 |
| 19 | -3.230093E-10 | -5.018815E-11 | -9.561316E-13 | 9.732892E-13 | 3.367057E-13 |
| | A17 | A18 | A19 | A20 | |
| 16 | 1.281303E-11 | 2.142890E-12 | -6.266314E-13 | -1.503450E-13 | |
| 17 | -3.726666E-11 | -8.549810E-12 | -4.859042E-12 | 9.954300E-13 | |
| 18 | 5.916773E-14 | 1.242432E-14 | -2.673484E-16 | -5.369376E-16 | |
| 19 | 6.269407E-14 | 5.414668E-15 | -3.068033E-16 | -4.041155E-16 | |

SN: Surface Number

| | Example 4 Basic Lens Data | | | | |
|---|---|---|---|---|---|
| | Si (Surface Number) | Ri (Radius of curvature) | Di (Surface separation) | Ndi (refractive index) | νdj (Abbe number) |
| G1 | 1 | 39.9265 | 0.85 | 1.92286 | 18.9 |
| | 2 | 25.0000 | 2.66 | 1.62041 | 60.3 |
| | 3 | 299.9979 | 0.10 | 1.00000 | |
| | 4 | 18.8559 | 2.35 | 1.72916 | 54.7 |
| | 5 | 49.8003 | D5 (variable) | 1.00000 | |
| G2 | 6 | 48.0645 | 0.60 | 1.88300 | 40.8 |
| | 7 | 4.7783 | 2.21 | 1.00000 | |
| | 8 | −24.6566 | 0.55 | 1.88300 | 40.8 |
| | 9 | 15.5380 | 0.10 | 1.00000 | |
| | 10 | 9.4526 | 1.85 | 1.92286 | 18.9 |
| | 11 | 318.8635 | D11 (variable) | 1.00000 | |
| | 12 (AD) | — | D12 (variable) | 1.00000 | |
| G3 | 13 | 7.0000 | 3.81 | 1.83400 | 37.2 |
| | 14 | −11.2649 | 0.50 | 1.92286 | 20.9 |
| | 15 | 12.5447 | 0.15 | 1.00000 | |
| | *16 | 25.6507 | 1.50 | 1.69350 | 53.2 |
| | *17 | −45.2388 | D17 (variable) | 1.00000 | |
| G4 | *18 | 23.6455 | 2.24 | 1.51760 | 63.5 |
| | *19 | −64.1063 | D19 (variable) | 1.00000 | |
| | 20 | ∞ | 1.05 | 1.51680 | 64.2 |
| | 21 | ∞ | | 1.00000 | |

(*:Aspherical, AD: Aperture Diaphragm)
(f=6.28~42.29mm, FNO.=3.22~5.73, 2ω=79.4° ~12.4°)

(B)

| Example 4 Variable Surface Separation Data | | | |
|---|---|---|---|
| Surface separation | Wide end (f=6.28) | Intermediate (f=16.31) | Telephoto end (f=42.29) |
| D5 | 0.29 | 7.15 | 15.13 |
| D11 | 7.58 | 4.70 | 1.79 |
| D12 | 4.40 | 0.40 | 0.40 |
| D17 | 4.65 | 8.52 | 16.77 |
| D19 | 7.34 | 10.10 | 3.63 |

FIG. 12

| Example 4 Aspheric Surface Data | | | | | |
|---|---|---|---|---|---|
| SN | Coefficients | | | | |
| | K | A3 | A4 | A5 | A6 |
| 16 | -5.367851E+00 | -6.651491E-05 | 8.213186E-04 | 1.123063E-04 | -8.308855E-05 |
| 17 | 9.955703E+00 | -1.700429E-04 | 1.859283E-03 | 7.398108E-05 | -3.876641E-05 |
| 18 | 4.433519E+00 | -2.259232E-03 | 8.942714E-04 | -1.727535E-04 | -1.008031E-05 |
| 19 | 9.920252E+00 | -2.199754E-03 | 7.692911E-04 | -1.523230E-04 | -4.755086E-06 |
| | A7 | A8 | A9 | A10 | A11 |
| 16 | 2.641921E-05 | 5.451345E-06 | -1.616398E-06 | -2.183328E-08 | 1.679473E-09 |
| 17 | 2.105163E-05 | 9.532103E-06 | 2.950241E-07 | -6.332370E-07 | -1.597368E-07 |
| 18 | 1.321838E-06 | 7.645195E-07 | 6.056783E-08 | -2.562664E-08 | -1.294663E-09 |
| 19 | -2.374933E-07 | 5.812830E-07 | 5.560334E-08 | -8.408590E-09 | -1.404535E-09 |
| | A12 | A13 | A14 | A15 | A16 |
| 16 | 6.556286E-09 | 9.597933E-10 | -5.119503E-10 | -2.005134E-11 | -1.898854E-12 |
| 17 | 1.851863E-08 | 1.094306E-09 | 3.703504E-09 | 4.789896E-10 | 8.057467E-11 |
| 18 | -7.342287E-11 | -1.538053E-11 | -2.220894E-13 | 4.660045E-13 | 1.982195E-13 |
| 19 | -2.904054E-10 | -4.317249E-11 | -2.377729E-13 | 9.904229E-13 | 3.165762E-13 |
| | A17 | A18 | A19 | A20 | |
| 16 | 1.281422E-11 | 1.888609E-12 | -7.401473E-13 | -1.154217E-13 | |
| 17 | -2.802228E-11 | -8.105781E-12 | -4.954829E-12 | 8.831793E-13 | |
| 18 | 5.919416E-14 | 1.186657E-14 | -3.617502E-16 | -5.180551E-16 | |
| 19 | 5.715415E-14 | 4.552809E-15 | -2.418672E-16 | -3.839468E-16 | |

SN: Surface Number

FIG. 13

| Conditional Expression | Expression Number | Example 1 | Example 2 | Example 3 | Example 4 |
|---|---|---|---|---|---|
| $0.4 < (Pt-Pw)/fw < 0.9$ | (1) | 0.785 | 0.753 | 0.695 | 0.701 |
| $4.0 < f1/fw < 5.0$ | (2) | 4.685 | 4.895 | 4.777 | 4.767 |
| $0.2 < f3/f4 < 0.5$ | (3) | 0.312 | 0.387 | 0.336 | 0.333 |

ZOOM LENS SYSTEM AND IMAGING APPARATUS

CROSS-REFERENCE TO RELATED APPLICATIONS

This application is based upon and claims the benefit of priority from the Japanese Patent Application No. 2008-119022 filed on Apr. 30, 2008; the entire contents of which are incorporated herein by reference.

BACKGROUND OF THE INVENTION

1. Technical Field

The invention relates to a zoom lens system and an imaging apparatus suitable for use in a video camera, a digital still camera, a portable information terminal (PDA: Personal Digital Assistance), and the like.

2. Description of Related Art

In imaging apparatuses such as a digital still camera, as imaging devices such as CCD (Charge Coupled Device), and CMOS (Complementary Metal Oxide Semiconductor) have been downsized, it has been also required to downsize the imaging apparatus as a whole. To downsize the whole of the imaging apparatus, it is preferable to downsize the whole of the lens system (that is, it is preferable to reduce a total length and an outer diameter of the lens system).

JP 2006-235062 A (corresponding to US 2006/0193062 A), JP 2005-215385 A (corresponding to US 2005/0168832 A), Japanese Patent No. 3706783 (corresponding to U.S. Pat. No. 6,633,437) and Japanese Patent No. 3392881 describe a four-group configuration zoom lens system in which four lens groups having positive, negative, positive, and positive refractive powers, respectively, are arranged in order from the object side. In the zoom lens system according to these publications, during zooming, the aperture diaphragm is configured to move independently or to move with a part of the lens groups.

In the zoom lens system according to JP 2006-235062 A (corresponding to US 2006/0193062 A), the aperture diaphragm is configured to move independently of the adjacent lens groups during zooming. However, since a moving distance of the aperture diaphragm with respect to an image plane during the zooming is relatively large, a length of a moving mechanism of the aperture diaphragm increases, and thus it is difficult to achieve downsizing. Also, since a focal length of the first lens group is relatively large, a length of the whole lens system also increases, and thus it is difficult to achieve downsizing.

Furthermore, in the zoom lens system according to Japanese Patent No. 3706783 (corresponding to U.S. Pat. No. 6,633,437), the aperture diaphragm is configured to move together with the third lens group during the zooming. However, since a focal length of the third lens group is equivalent to that of the fourth lens group, the movement of the third lens group during the zooming increases, and thus it is difficult to achieve downsizing. Furthermore, since the focal length of the first lens group is relatively large, the length of the whole lens system also increases, and thus it is difficult to achieve downsizing.

Furthermore, in the zoom lens system according to JP 2005-215385 A (corresponding to US 2005/0168832 A) and Japanese Patent No. 3392881, during the zooming, the aperture diaphragm is moved so that a position of the aperture diaphragm at the telephoto end is closer to the image side than that at the wide-angle end. Hence, a distance between the first lens group and the aperture diaphragm increases at the telephoto end, and thus outer diameters of the lenses of the first lens group increase. Therefore, it is difficult to achieve downsizing.

SUMMARY OF THE INVENTION

The invention has been made in view of the above circumstances and provides a zoom lens system and an imaging apparatus having a high variable power ratio and a small size as a whole.

According to a first aspect of the invention, a zoom lens system includes, in order from an object side, a first lens group having a positive refractive power, a second lens group having a negative refractive power, a stop, a third lens group having a positive refractive power, and a fourth lens group having a positive refractive power. Zooming is performed by moving at least the first lens group, the second lens group, the stop, and the third lens group along an optical axis. During the zooming, a position of the stop on the optical axis at a wide-angle end is closer to an image plane than that at a telephoto end. A space on the optical axis at the wide-angle end between the stop and the third lens group is larger than that at the telephoto end. The following conditional expression is satisfied:

$$0.4 < (Pt - Pw)/fw < 0.9 \quad (1)$$

where fw denotes a focal length of the whole system at the wide-angle end, Pw denotes a distance on the optical axis at the wide-angle end between the image plane and the stop, and Pt denotes a distance on the optical axis at the telephoto end between the image plane and the stop.

According to second aspect of the invention, a zoom lens system includes, in order from an object side, a first lens group having a positive refractive power, a second lens group having a negative refractive power, a stop, a third lens group having a positive refractive power, and a fourth lens group having a positive refractive power. Zooming is performed by moving at least the first lens group, the second lens group, the stop, and the third lens group along an optical axis. During the zooming, a position of the stop on the optical axis at a wide-angle end is closer to an image plane than that at a telephoto end. A space on the optical axis at the wide-angle end between the stop and the third lens group is larger than that at the telephoto end. The following conditional expression is satisfied:

$$4.0 < f1/fw < 5.0 \quad (2)$$

where f1 denotes a composite focal length of the first lens group, and fw denotes a focal length of the whole system at the wide-angle end.

According to third aspect of the invention, a zoom lens system includes, in order from an object side, a first lens group having a positive refractive power, a second lens group having a negative refractive power, a stop, a third lens group having a positive refractive power, and a fourth lens group having a positive refractive power. Zooming is performed by moving at least the first lens group, the second lens group, the stop, and the third lens group along an optical axis. During the zooming, a position of the stop on the optical axis at a wide-angle end is closer to an image plane than that at a telephoto end. A space on the optical axis at the wide-angle end between the stop and the third lens group is larger than that at the telephoto end. The following conditional expression is satisfied:

$$0.2 < f3/f4 < 0.5 \quad (3)$$

where f3 denotes a composite focal length of the third lens group, and f4 denotes a composite focal length of the fourth lens group.

The zoom lens system according to any one of the first to third aspects of the invention includes, in order from an object side, the first lens group having the positive refractive power, the second lens group having the negative refractive power, the stop, the third lens group having the positive refractive power, and the fourth lens group having the positive refractive power. Also, the zooming is performed by moving at least the first lens group, the second lens group, the stop, and the third lens group along the optical axis. Thereby, it becomes easy to downsize the whole lens system while achieving a high variable power ratio. In particular, while the appropriate conditional expression is satisfied, during the zooming, the position of the stop on the optical axis at the wide-angle end is closer to the image plane than that at the telephoto end, and the space on the optical axis at the wide-angle end between the stop and the third lens group is larger than that at the telephoto end. Thereby the length of the whole lens system is suppressed. In addition, heights of rays passing through the first lens group are lowered, thereby suppressing the lens diameter of the first lens group. Therefore, it becomes easy to downsize the whole lens system.

Furthermore, the following preferable configuration may be appropriately employed and satisfied. Thereby, it becomes more advantageous to achieve downsizing.

In the zoom lens system of the first aspect, at least one of the following conditional expressions may be satisfied:

$$4.0 < f1/fw < 5.0 \quad (2)$$

$$0.2 < f3/f4 < 0.5 \quad (3)$$

where f1 denote a composite focal length of the first lens group, f3 denotes a composite focal length of the third lens group, and f4 denotes a composite focal length of the fourth lens group.

In the zoom lens system of any one of the first to third aspects, the second lens group may include, in order from the object side, a negative lens of which an image-side surface is a concave surface being smaller in an absolute value of a radius of curvature than that of an object-side surface thereof, a biconcave lens, and a positive lens having a convex surface on the object side. The negative lens, the biconcave lens and the positive lens of the second lens group are not cemented to each other.

Also, the third lens group may include, in order from the object side, a cemented lens formed by cementing (i) a positive lens of which an object-side surface is a convex surface being smaller in an absolute value of a radius of curvature than that of an image-side surface thereof and (ii) a negative lens having a concave surface on the image side, and a single lens having at least one aspheric surface.

Also, the fourth lens group may consist of a positive lens. Furthermore, the positive lens of the fourth lens group may have at least one aspheric surface.

Also, during the zooming, the fourth lens group may be moved so that a position of the fourth lens group at the telephoto end is closer to the image plane than that at the wide-angle end. Furthermore, the fourth lens group may be moved during focusing.

According to fourth aspect of the invention, an imaging apparatus includes the zoom lens system of any one of the first to third aspects, and an imaging device that outputs an imaging signal based on an optical image formed by the zoom lens system.

In the imaging apparatus according to the fourth aspect of the invention, the downsized and high-performance zoom lens system of any one of the first to third aspects of the invention is used as an imaging lens. Thus, it is possible to downsize the imaging apparatus as a whole.

According to any one of the first to third aspects of the invention, the zoom lens system is configured to include, in order from the object side, the first lens group having the positive refractive power, the second lens group having the negative refractive power, the stop, the third lens group having the positive refractive power, and the fourth lens group having the positive refractive power. In the configuration of the zoom lens system, a movement of the lens groups and the stop during the zooming is optimized in combination with the appropriate conditional expression. Therefore, it is possible to downsize the whole lens system while achieving a high variable power ratio.

Furthermore, in the imaging apparatus according to the fourth aspect of the invention, the downsized and high-performance zoom lens system according to any one of the first to third aspects of the invention is used as an imaging lens. Therefore, it is possible to downsize the whole imaging apparatus while maintaining a favorable imaging performance of a high variable power ratio.

BRIEF DESCRIPTION OF THE DRAWINGS

FIG. 5 is a diagram showing lens data of the zoom lens system according to Example 1, where FIG. 5(A) shows basic lens data, and FIG. 5(B) shows data of on-axis surface spacings between parts moved during zooming.

FIG. 6 is a diagram showing aspheric surface data of the zoom lens system according to Example 1.

FIG. 7 is a diagram showing lens data of the zoom lens system according to Example 2, where FIG. 7(A) shows basic lens data, and FIG. 7(B) shows data of on-axis surface spacings between parts moved during zooming.

FIG. 8 is a diagram showing aspheric surface data of the zoom lens system according to Example 2.

FIG. 9 is a diagram showing lens data of the zoom lens system according to Example 3, where FIG. 9(A) shows basic lens data, and FIG. 9(B) shows data of on-axis surface spacings between parts moved during zooming.

FIG. 10 is a diagram showing aspheric surface data of the zoom lens system according to Example 3.

FIG. 11 is a diagram showing lens data of the zoom lens system according to Example 4, where FIG. 11(A) shows basic lens data, and FIG. 11(B) shows data of on-axis surface spacings between parts moved during zooming.

FIG. 12 is a diagram showing aspheric surface data of the zoom lens system according to Example 4.

FIG. 13 is a diagram collectively showing values of conditional expressions according to the examples.

FIG. 14(A) shows spherical aberration, FIG. 14(B) shows astigmatism, FIG. 14(C) shows distortion, and FIG. 14(D) shows lateral chromatic aberration.

FIG. 15(A) shows spherical aberration, FIG. 15(B) shows astigmatism, FIG. 15(C) shows distortion, and FIG. 15(D) shows lateral chromatic aberration.

FIG. 16(A) shows spherical aberration, FIG. 16(B) shows astigmatism, FIG. 16(C) shows distortion, and FIG. 16(D) shows lateral chromatic aberration.

FIG. 17(A) shows spherical aberration, FIG. 17(B) shows astigmatism, FIG. 17(C) shows distortion, and FIG. 17(D) shows lateral chromatic aberration.

FIG. 18(A) shows spherical aberration, FIG. 18(B) shows astigmatism, FIG. 18(C) shows distortion, and FIG. 18(D) shows lateral chromatic aberration.

FIG. 19(A) shows spherical aberration, FIG. 19(B) shows astigmatism, FIG. 19(C) shows distortion, and FIG. 19(D) shows lateral chromatic aberration.

FIG. 20(A) shows spherical aberration, FIG. 20(B) shows astigmatism, FIG. 20(C) shows distortion, and FIG. 20(D) shows lateral chromatic aberration.

FIG. 21(A) shows spherical aberration, FIG. 21(B) shows astigmatism, FIG. 21(C) shows distortion, and FIG. 21(D) shows lateral chromatic aberration.

FIG. 22(A) shows spherical aberration, FIG. 22(B) shows astigmatism, FIG. 22(C) shows distortion, and FIG. 22(D) shows lateral chromatic aberration.

FIG. 23(A) shows spherical aberration, FIG. 23(B) shows astigmatism, FIG. 23(C) shows distortion, and FIG. 23(D) shows lateral chromatic aberration.

FIG. 24(A) shows spherical aberration, FIG. 24(B) shows astigmatism, FIG. 24(C) shows distortion, and FIG. 24(D) shows lateral chromatic aberration.

FIG. 25(A) shows spherical aberration, FIG. 25(B) shows astigmatism, FIG. 25(C) shows distortion, and FIG. 25(D) shows lateral chromatic aberration.

DETAILED DESCRIPTION OF EMBODIMENTS OF THE INVENTION

Hereinafter, embodiments of the invention will be described in detail with reference to the accompanying drawings.

Figure 1:
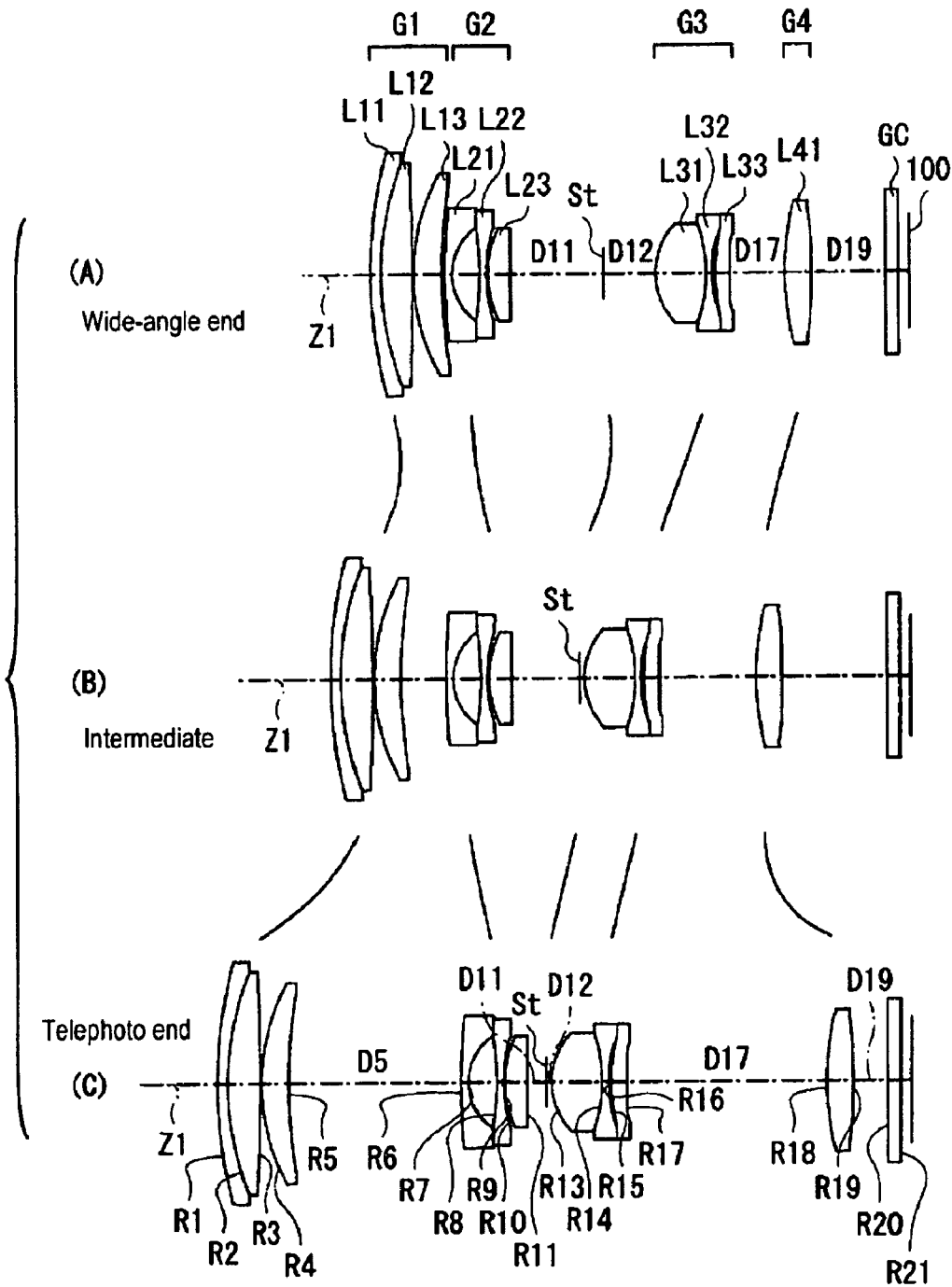
FIG. 1 is a section diagram of a first exemplary configuration of a zoom lens system according to an embodiment of the invention, corresponding to Example 1.
Figure 2:
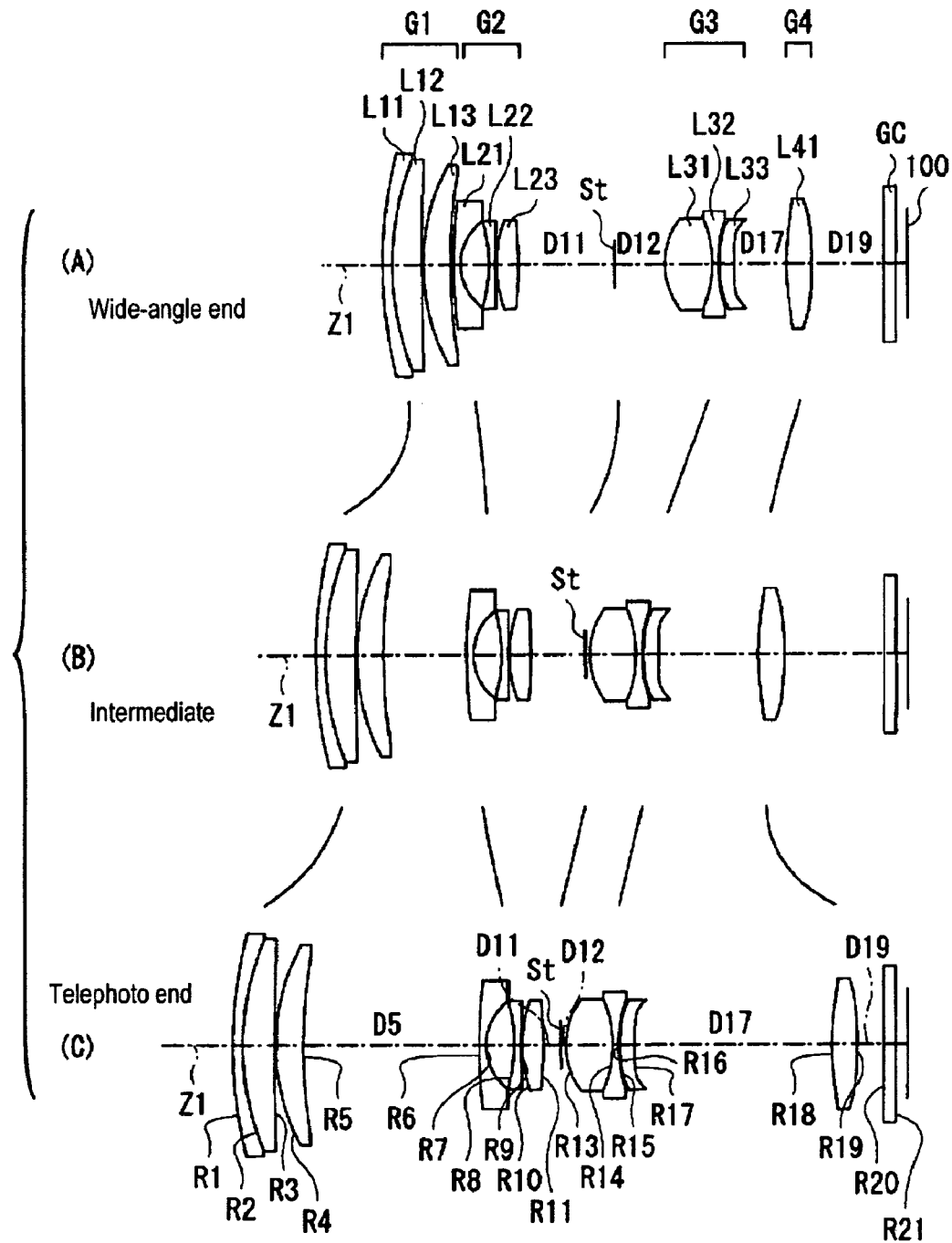
FIG. 2 is a section diagram of a second exemplary configuration of a zoom lens system according to an embodiment of the invention, corresponding to Example 2.
Figure 3:
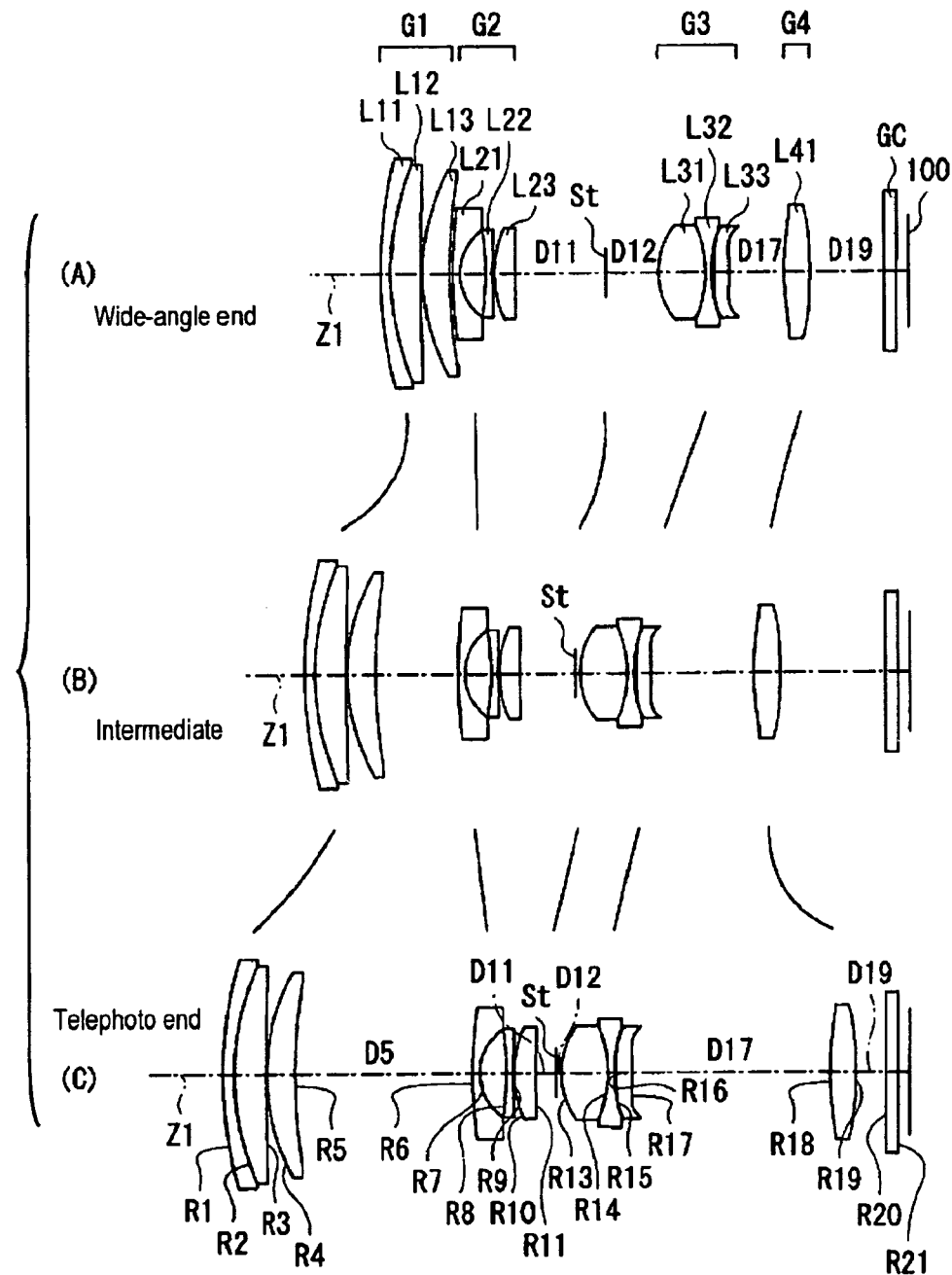
FIG. 3 is a section diagram of a third exemplary configuration of a zoom lens system according to an embodiment of the invention, corresponding to Example 3.
Figure 4:
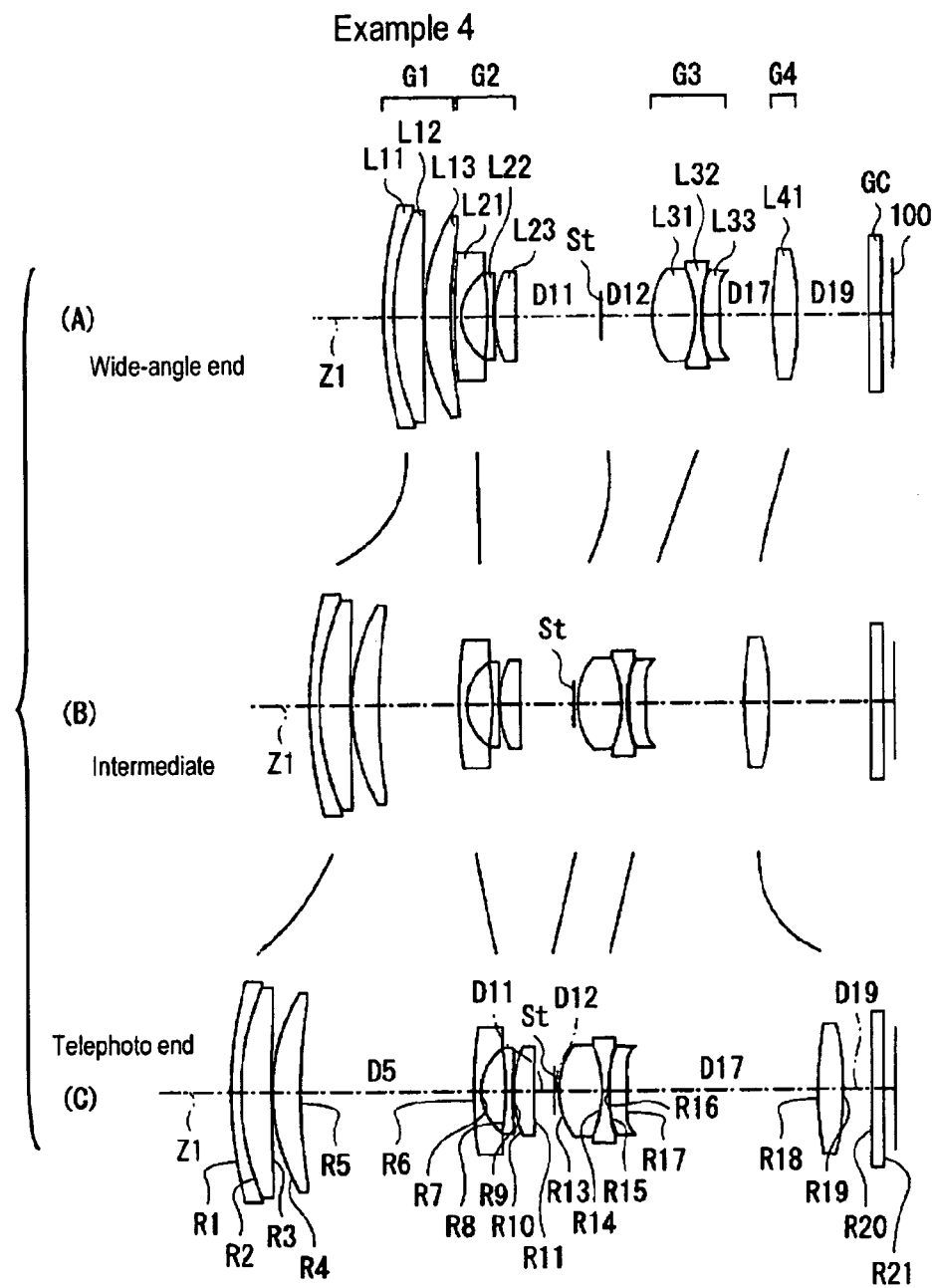
FIG. 4 is a section diagram of a fourth exemplary configuration of a zoom lens system according to an embodiment of the invention, corresponding to Example 4.
Figure 14:
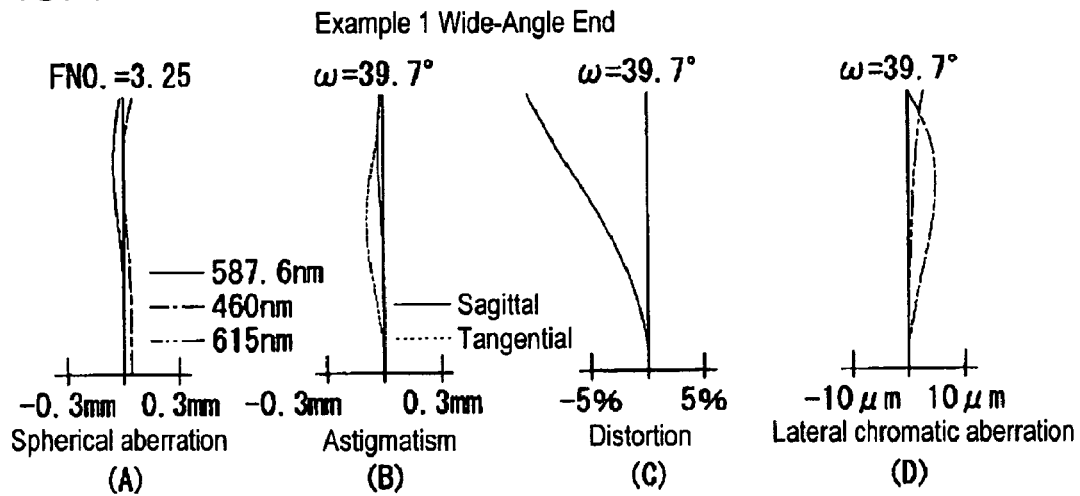
FIG. 14 is an aberration diagram showing various aberrations of the zoom lens system at the wide-angle end according to Example 1, where
Figure 15:
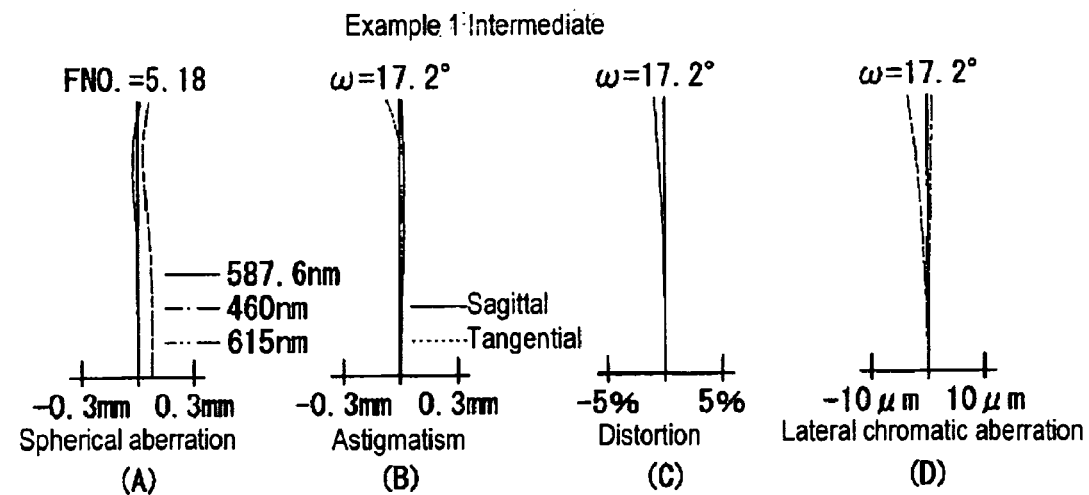
FIG. 15 is an aberration diagram showing various aberrations of the zoom lens system at the intermediate range according to Example 1, where
Figure 16:
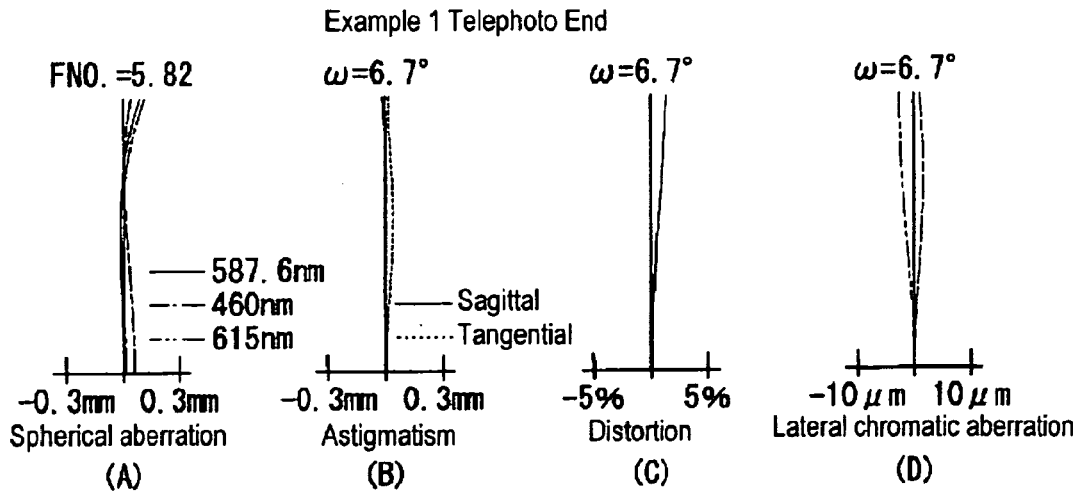
FIG. 16 is an aberration diagram showing various aberrations of the zoom lens system at the telephoto end according to Example 1, where
Figure 17:
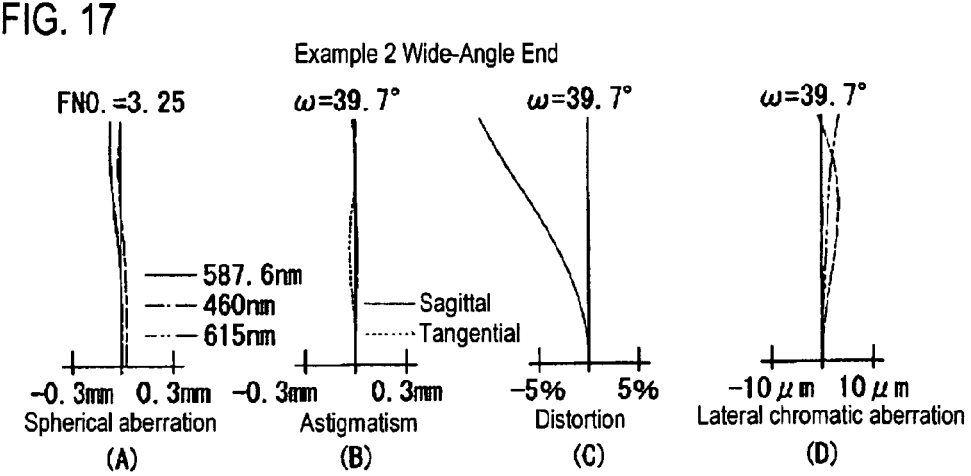
FIG. 17 is an aberration diagram showing various aberrations of the zoom lens system at the wide-angle end according to Example 2, where
Figure 18:
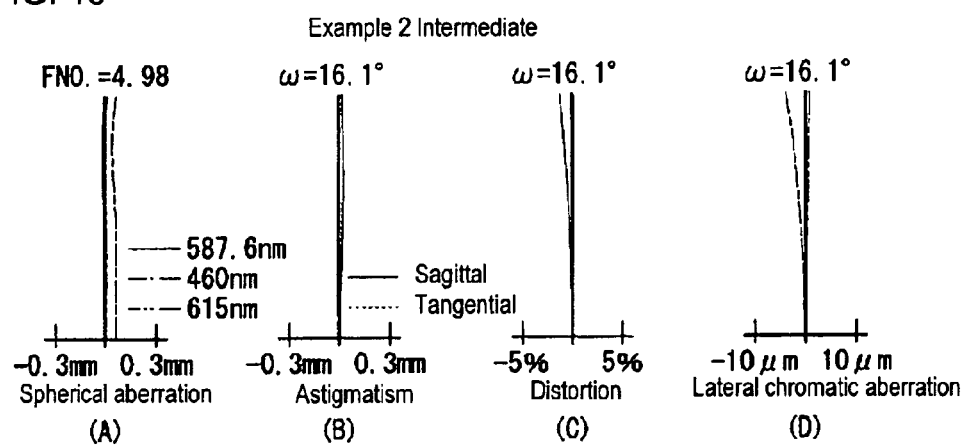
FIG. 18 is an aberration diagram showing various aberrations of the zoom lens system at an intermediate range according to Example 2, where
Figure 19:
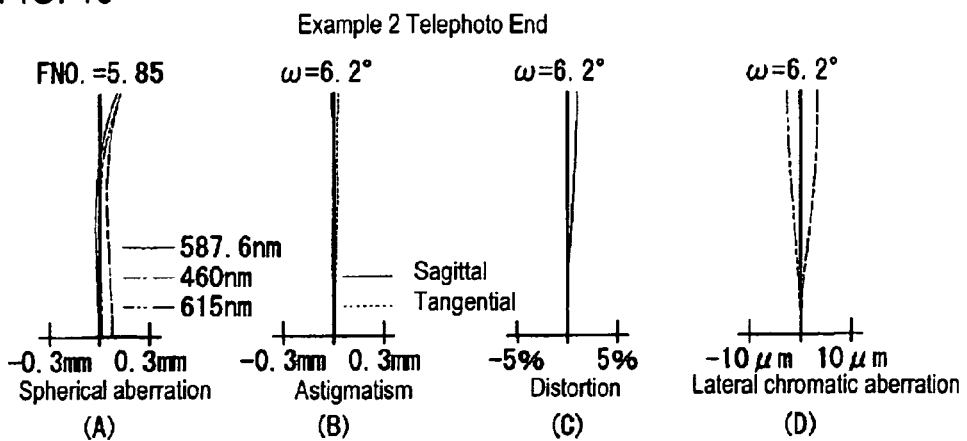
FIG. 19 is an aberration diagram showing various aberrations of the zoom lens system at the telephoto end according to Example 2, where
Figure 20:
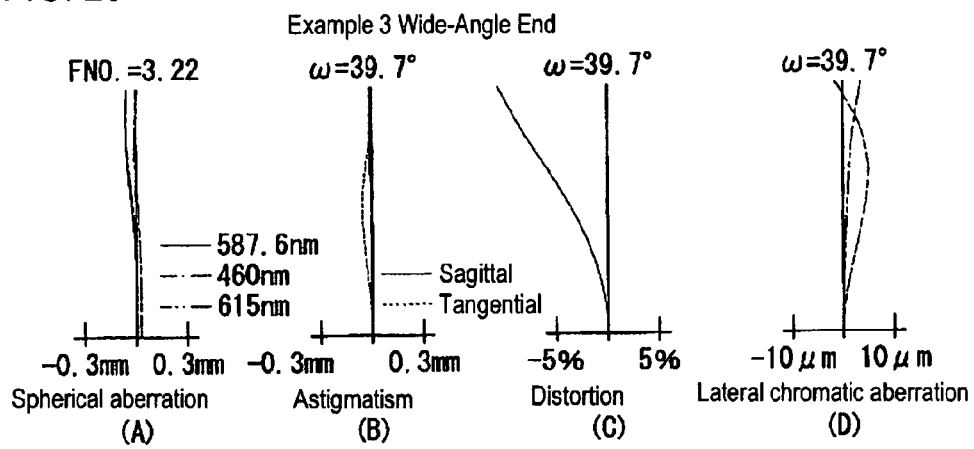
FIG. 20 is an aberration diagram showing various aberrations of the zoom lens system at the wide-angle end according to Example 3, where
Figure 21:
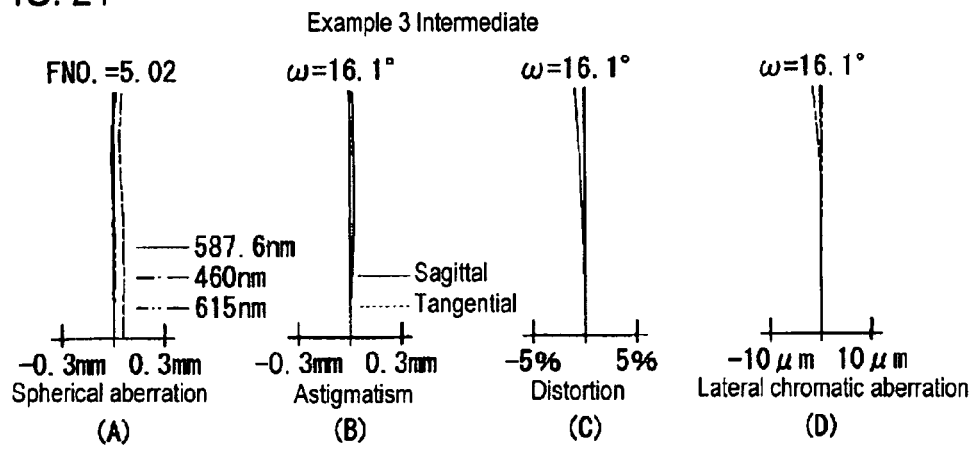
FIG. 21 is an aberration diagram showing various aberrations of the zoom lens system at an intermediate range according to Example 3, where
Figure 22:
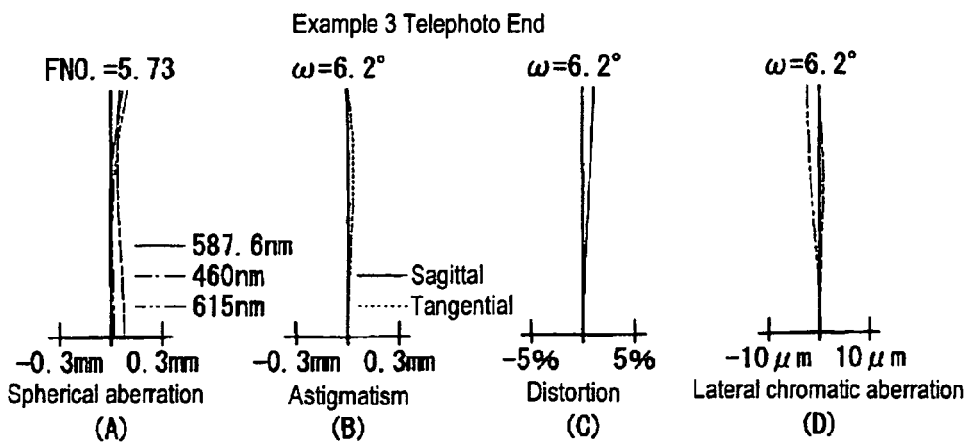
FIG. 22 is an aberration diagram showing various aberrations of the zoom lens system at the telephoto end according to Example 3, where
Figure 23:
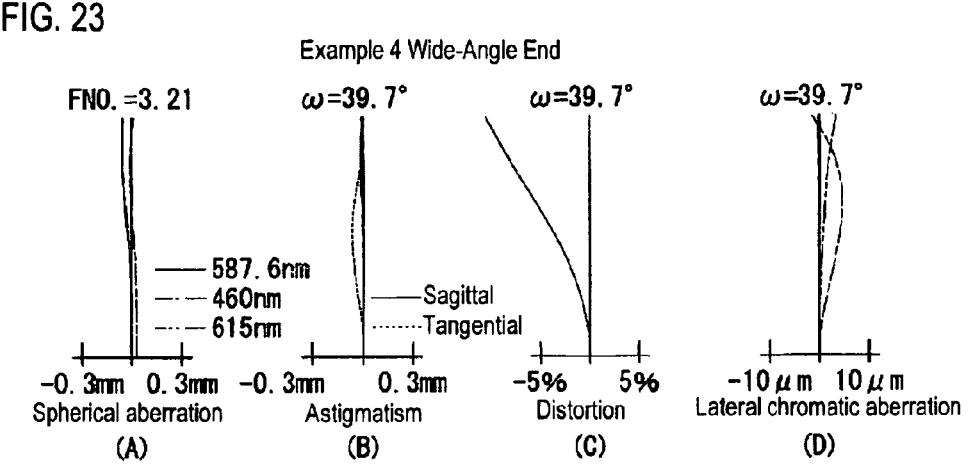
FIG. 23 is an aberration diagram showing various aberrations of the zoom lens system at the wide-angle end according to Example 4, where
Figure 24:
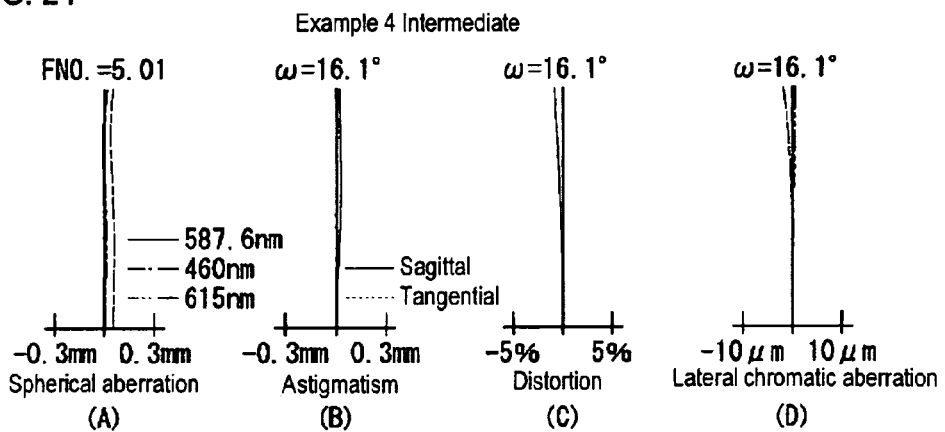
FIG. 24 is an aberration diagram showing various aberrations of the zoom lens system at an intermediate range according to Example 4, where
Figure 25:
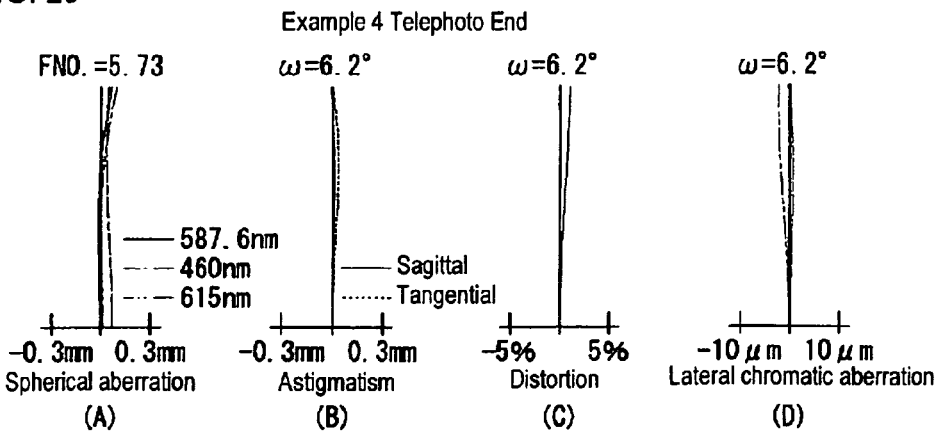
FIG. 25 is an aberration diagram showing various aberrations of the zoom lens system at the telephoto end according to Example 4, where

FIGS. 1(A), 1(B), and 1(C) show a first exemplary configuration of a zoom lens system according to an embodiment of the invention. The exemplary configuration corresponds to the lens configuration of a first numerical example (FIGS. 5(A), 5(B), and 6) which will be described later. Furthermore, FIG. 1(A) corresponds to an optical system arrangement at the wide-angle end (a minimum focal length state), FIG. 1(B) corresponds to the optical system arrangement at an intermediate range (an intermediate focal length state), and FIG. 1(C) corresponds to the optical system arrangement at the telephoto end (a maximum focal length state). Likewise, FIGS. 2(A), 2(B), and 2(C) to FIGS. 4(A), 4(B), and 4(C) show sections of second to fourth exemplary configurations corresponding to the lens configurations of second to fourth numerical examples which will be described later. In FIGS. 1(A), 1(B), and 1(C) to FIGS. 4(A), 4(B), and 4(C), a reference sign Ri represents a radius of curvature of an i-th surface, where the number i denotes sequential number that sequentially increases as it gets closer to an image side (an image formation side) when a object-side surface of the most-object-side constituent element is regarded as a first surface. A reference sign Di represents a surface spacing between an i-th surface and an (i+1)-th surface on an optical axis Z1. Furthermore, as for the reference sign Di, only on-axis surface spacings D5, D11, D12, D17, and D19 which vary with zooming are noted. Furthermore, all the exemplary configurations are basically the same, and thus hereinafter description will be given based on the first exemplary configuration shown in FIGS. 1(A), 1(B), and 1(C).

The zoom lens system has, along an optical axis Z in order from the object side, a first lens group G1, a second lens group G2, a third lens group G3, and a fourth lens group G4. An optical aperture diaphragm St is disposed between the second lens group G2 and the third lens group G3.

The zoom lens system is mountable on not only a photographic apparatus such as a video camera and a digital still camera but also a portable information terminal such as PDA. On the image side of the zoom lens system, there is disposed a member according to the configuration of a photographing part of a camera on which it is mounted. For example, an imaging device 100 such as CCD (Charge Coupled Device) or CMOS (Complementary Metal Oxide Semiconductor) is disposed on an image formation plane (an imaging plane) of the zoom lens system. The imaging device 100 outputs an imaging signal based on an optical image formed by the zoom lens system. At least the zoom lens system and the imaging device 100 constitute the imaging apparatus according to this embodiment. Between the final lens group (the fourth lens group G4) and the imaging device 100, various optical members GC may be disposed according to the configuration of the camera on which the lens system is mountable. For example, an optical member having a plate shape such as an infrared cut filter or a cover glass for protecting the imaging plane may be disposed.

Figure 26:
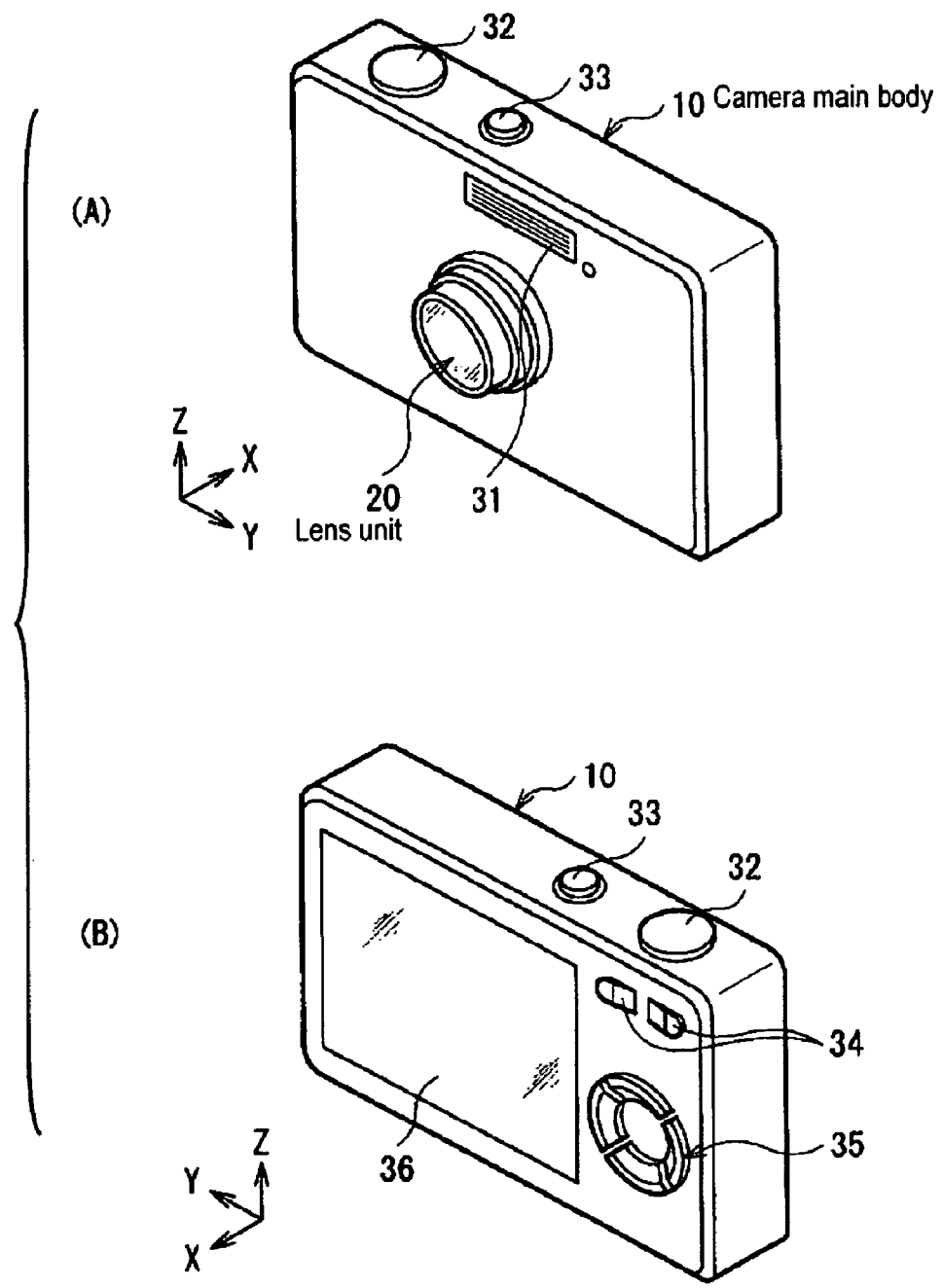
FIG. 26 is an exterior view showing an exemplary configuration of a digital still camera as an imaging apparatus according to an embodiment of the invention.

FIGS. 26(A) and 26(B) show a digital still camera as an example of the imaging apparatus according to this embodiment. In particular, FIG. 26(A) shows an exterior of the digital still camera as viewed from the front side thereof, and FIG. 26(B) shows an exterior of the digital still camera as viewed from the rear side thereof. The digital still camera has a camera main body 10, and an electronic flash emitting unit 31 for emitting electronic flash light is provided on the upper center of the front side of the camera main body 10. On the upper side of the camera main body 10, a release button 32 and a power button 33 are provided. On the rear side of the camera main body 10, a display unit 36 and operation units 34 and 35 are provided. The display unit 36 displays a taken image. On the center on the front side of the camera main body 10, a photographing aperture through which light originated from a shooting target is incident is provided. On a position corresponding to the photographing aperture, a lens unit 20 is provided. The lens unit 20 is configured to house lens members in a retractable-type lens barrel. In the camera main body 10, there are provided the imaging device such as CCD for outputting an imaging signal based on a subject image formed by the lens unit 20, a signal processing circuit for generating an image by processing the imaging signal output from the imaging device, a recording medium for recording the generated image, and the like. In this digital still camera, a still image per one frame is taken by pressing the release button 32, and image data acquired from the photographing is recorded on the recording medium (not shown in the drawings) in the camera main body 10. When the zoom lens system according to this embodiment is employed as the lens unit 20 in such a camera, it is possible to acquire a high resolution imaging signal. In the camera main body 10, a high resolution image can be generated based on the imaging signal.

Figure 27:
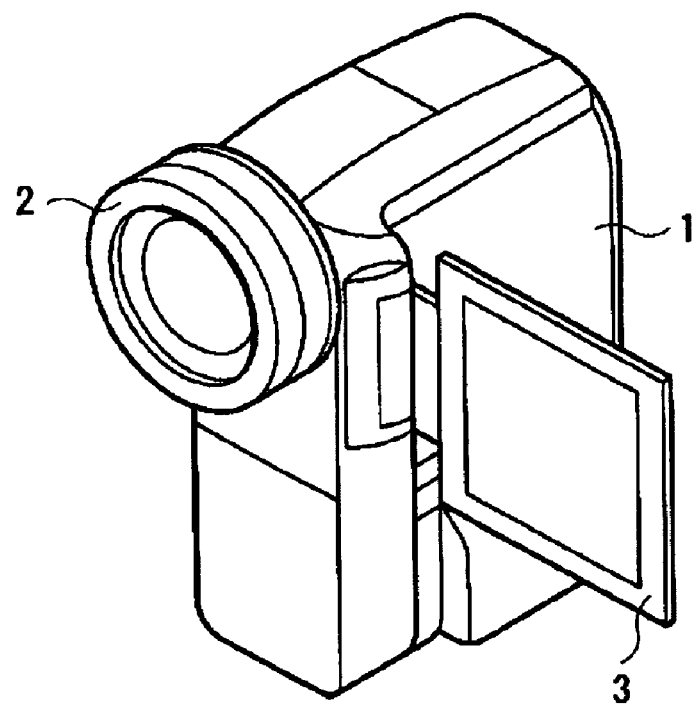
FIG. 27 is an exterior view showing an exemplary configuration of a video camera as an imaging apparatus according to an embodiment of the invention.

FIG. 27 shows an exemplary configuration of a video camera as an example of the imaging apparatus on which the zoom lens system is mountable. The video camera has a camera main body 1 and a camera lens 2 provided on the upper part of the camera main body 1. In the camera main body 1, there are provided the imaging device 100 such as CCD for outputting an imaging signal based on a subject image formed by the camera lens 2, a signal processing circuit for generating an image by processing the imaging signal output from the imaging device 100, a recording medium for recording the generated image, and the like. Furthermore, the camera main body 1 is equipped with a display unit 3 for displaying the shot image. The zoom lens system according to this embodiment is applicable even to the camera lens 2 of such a video camera.

Furthermore, the zoom lens system according to this embodiment is suitable for a high-pixel imaging apparatus having, for example, 10 million pixels or more, particularly, 12 to 16 million pixels or so.

This zoom lens system is configured to performing zooming by moving at least the first lens group G1, the second lens group G2, the aperture diaphragm St, and the third lens group G3 along the optical axis. Furthermore, the fourth lens group G4 may be configured to move during the zooming. Further, the fourth lens group G4 may be configured to move during focusing. By setting a large number of lens groups as movable groups, it is possible to reduce loads of an effect of image plane correction or a zooming effect assigned to each lens group, as compared with the case where only a small number of lens groups are set as movable groups.

More specifically, as zooming is performed from the wide-angle end to the intermediate range and further to the telephoto end, the lens groups and the aperture diaphragm St are moved, for example, along the loci from the state of FIG. 1(A) to the state of FIG. 1(B) and further to the state of FIG. 1(C) as illustrated by a solid line in the drawing. In particular, the lens groups and the aperture diaphragm St are moved so that a position of the aperture diaphragm St on the optical axis at the wide-angle end is closer to the image plane than that at the telephoto end, and a space on the optical axis at the wide-angle end between the aperture diaphragm St and the third lens group G3 is larger than that at the telephoto end. Furthermore, the fourth lens group G4 may be moved so that the fourth lens group G4 at the telephoto end is closer to the image plane than that at the wide-angle end during zooming.

The first lens group G1 has a positive refractive power as a whole. The first lens group G1 may be formed of, for example, three lenses. More specifically, it is preferable that the first lens group G1 includes, in order from the object side, a cemented lens that is formed of a negative lens L11 having a convex surface directed toward the object side and a positive lens L12, and a positive lens L13 that has a convex surface directed toward the object side.

The second lens group G2 has a negative refractive power as a whole. The second lens group G2 may be formed of, for example, three lenses. More specifically, it is preferable that the second lens group G2 includes, in order from the object side, a negative lens L21 of which an image-side surface is formed as a strongly concave surface (a concave surface being smaller in an absolute value of a radius of curvature than that of the object-side surface), a biconcave lens L22, and a positive lens L23 having a convex surface directed toward the object side. Furthermore, it is preferable that the lenses of the second lens group G2 be configured not to be cemented to each other.

The third lens group G3 has a positive refractive power as a whole. The third lens group G3 may be formed of, for example, three lenses. More specifically, it is preferable that the third lens group G3 includes, in order from the object side, a cemented lens formed of (i) a positive lens L31 of which an object-side surface is formed as a strongly convex surface (a convex surface being smaller in an absolute value of a radius of curvature than that of the image-side surface) and (ii) a negative lens L32 having a concave directed toward the image side, and a single lens L33 having at least one aspheric surface.

The fourth lens group G4 has a positive refractive power as a whole. It is preferable that the fourth lens group G4 consists of one positive lens L41. Furthermore, the positive lens L41 may have at least one aspheric surface.

It is preferable that the zoom lens system be configured to selectively satisfy the following conditional expressions. Here, fw denotes a focal length of the whole system at the wide-angle end, Pw denotes a distance on the optical axis at the wide-angle end between the image plane and the aperture diaphragm St, Pt denotes a distance on the optical axis at the telephoto end between the image plane and the aperture diaphragm St, f1 denotes a composite focal length of the first lens group G1, f3 denotes a composite focal length of the third lens group G3, and f4 denotes a composite focal length of the fourth lens group G4.

$$0.4 < (Pt-Pw)/fw < 0.9 \qquad (1)$$

$$4.0 < f1/fw < 5.0 \qquad (2)$$

$$0.2 < f3/f4 < 0.5 \qquad (3)$$

Next, action and effect of the zoom lens system configured as described above will be described.

In the zoom lens system, there are arranged, in order from the object side, the first lens group G1 having the positive refractive power, the second lens group G2 having the negative refractive power, the aperture diaphragm St, the third lens group G3 having the positive refractive power, and the fourth lens group G4 having the positive refractive power. In addition, zooming is performed by moving at least the first lens group G1, the second lens group G2, the aperture diaphragm St, and third lens group G3 along an optical axis Z1. Thereby, it becomes easy to downsize the whole lens system while achieving a high variable power ratio. In particular, while the appropriate conditional expression is satisfied, during zooming, a position of the aperture diaphragm St on the optical axis at the wide-angle end is closer to the image plane than that at the telephoto end, and a space on the optical axis at the wide-angle end between the aperture diaphragm St and the third lens group G3 is larger than that at the telephoto end. Thereby, the length of the whole lens system is suppressed. Also, heights of rays passing through the first lens group G1 are lowered, thereby suppressing the lens diameter of the first lens group G1. As a result, it becomes easy to downsize the whole lens system.

Furthermore, by using the cemented lens formed of the negative lens L11 and the positive lens L12 in the first lens group G1, it is possible to correct longitudinal chromatic aberration, and particularly, it is possible to reduce the longitudinal chromatic aberration at the telephoto end. Furthermore, by disposing the positive lens L13 having the convex surface directed toward the object side, it is possible to correct field curvature and distortion.

Furthermore, the second lens group G2 is configured to include, in order from the object side, the negative lens L21 of which the image-side surface is strongly concave, the biconcave lens L22, and the positive lens L23 having the convex surface directed toward the object side. Also, the lenses are configured not to be cemented to each other. Thereby, it is possible to suppress fluctuation of various aberrations in the whole zoom range. More specifically, it is possible to obtain the following effects by means of the second lens group G2. In the zoom lens system, as a length of the whole lens decreases, a refractive power of the second lens group G2 increases, and thus fluctuation of aberrations tends to increase during zooming. Accordingly, the second lens G2 is formed of three lenses that are not cemented to each other. Thus, design freedom is improved as compared with the case where the lenses are cemented, thereby achieving a design having small aberration fluctuation. Further, by disposing the negative lens L21 and the biconcave lens L22 in order from the object side, it is possible to correct field curvature and distortion. Also, by disposing the positive lens L23, it is possible to satisfactorily correct lateral chromatic aberration at the wide-angle end and longitudinal chromatic aberration at the telephoto end.

Also, the third lens group G3 is configured to include, in order from the object side, the cemented lens formed of the positive lens L31 of which the object-side surface is formed as a strongly convex surface and the negative lens L32 having the concave surface directed toward the image side, and the single lens L33 having at least one aspheric surface. Thereby, it is possible to correct various aberrations at the wide-angle end where a distance from the aperture diaphragm St is large as compared with the telephoto end. More specifically, it is possible to obtain the following effects by means of the third lens group G3. In this zoom lens system, the aperture diaphragm St is configured to be further distant from the third lens group G3 at wide-angle end as compared with the telephoto end. Thus, a ray height at the wide-angle end is large as compared with that at the telephoto end. Therefore, field curvature and distortion tends to increase at the wide-angle end. Accordingly, by disposing the single lens L33, which is aspheric on the image side of the positive lens L31 and the negative lens L32, it is possible to correct field curvature and distortion at the wide-angle end, and simultaneously it is possible to correct spherical aberration. Furthermore, by cementing the positive lens L31 and the negative lens L32, it is possible to correct longitudinal chromatic aberration.

Furthermore, the fourth lens group G4 is configured to move during zooming so that the fourth lens group G4 at the telephoto end is closer to the image plane than that at the wide-angle end. Thus, it is possible to decrease a length of the whole lens system while achieving a high variable power ratio. Also, the fourth lens group G4 is configured to move during focusing. Thus, it is possible to achieve fast focusing. More specifically, it is possible to obtain the following effects by means of the fourth lens group G4. When the fourth lens group G4 is moved so that the fourth lens group G4 at the telephoto end is closer to the image plane than that at the wide-angle end during zooming, it is possible to further increase a space between the third lens group G3 and the fourth lens group G4 at the telephoto end as compared with that at the wide-angle end. Therefore, it is easy to achieve a high variable power. Further, a movement amount of image plane at the time of close-up shooting increases at the telephoto end as compared with the wide-angle end, and movement amounts of lenses moved during focusing also increase at the telephoto end as compared with the wide-angle end. When the fourth lens group G4 is used for focusing, since the fourth lens group G4 is moved so that the fourth lens group G4 at the telephoto end is closer to the image plane than that at the wide-angle end, it is possible to make a position of the fourth lens group G4 at the telephoto end at the time of close-up shooting to be close to a position thereof at the wide-angle end. When the fourth lens group G4 is driven by a motor, in the whole zoom range from the wide-angle end to the telephoto end, it is possible to suppress a movement amount of the fourth lens group G4 during zooming and focusing, and it is possible to decrease a length of a guide that supports a frame of the fourth lens group G4 and to decrease the length of the lens system at the time of retraction.

Furthermore, when the fourth lens group G4 consists of one positive lens L41, it is possible to achieve reduction in cost and size. Further, it is possible to reduce a weight of the lenses, which are moved during focusing. Thus, it is possible to achieve fast focusing. In addition, at least one surface of the positive lens L41 is formed in an aspheric shape, and thus it is possible to correct field curvature. Accordingly, it is possible to further downsize a length of the whole lens system.

The conditional expression (1) relates to a moving distance of the aperture diaphragm during zooming. By satisfying this expression, it is possible to downsize an lens outer diameter of the first lens group G1, and it is possible to achieve reduction in lens length at the time of retraction. If (Pt−Pw)/fw falls below the lower limit of the conditional expression (1), a movement amount of the aperture diaphragm St during zooming decreases. Thus, it is possible to decrease a length of an aperture diaphragm moving mechanism. However, an effective area of rays in the first lens group G1 increases, and thus it becomes difficult to downsize a lens outer diameter. Furthermore, if (Pt−Pw)/fw exceeds the upper limit thereof, the effective area of rays in the first lens group G1 decreases, and thus it is advantageous to downsize an lens outer diameter. However, a length of the aperture diaphragm moving mechanism increases, and thus it becomes difficult to reduce a length of the lens system at the time of retraction.

The conditional expression (2) relates to a focal length fl of the first lens group G1. By satisfying this expression, it is possible to downsize the optical system, and it is possible to satisfactorily correct aberrations in the whole zoom range. If f1/fw falls below the lower limit of the conditional expression (2), a refractive power of the first lens group G1 increases, and thus it is advantageous to downsize the optical system. However, occurrence of aberrations in the first lens group G1 increases, and thus it becomes difficult to satisfactorily correct aberrations in the whole zoom range. Furthermore, if f1/fw exceeds the upper limit, a refractive power of the first lens group G1 decreases, and thus a length of the whole lens increases, and an outer diameter of the first lens group G1 increases. Therefore, it is difficult to downsize the optical system.

The conditional expression (3) relates to focal lengths of the third lens group G3 and the fourth lens group G4. By satisfying this expression, it is possible to downsize the optical system, and it is possible to decrease incident angles of rays being incident on the imaging device. If f3/f4 falls below the lower limit of the conditional expression (3), a refractive power of the third lens group G3 increases, and thus a length of the whole lens system decreases. However, since the refractive power of the fourth lens group G4 decreases, the incident angles of rays being incident on the imaging device increases, and thus it tends to influence shading. Furthermore, if f3/f4 exceeds the upper limit thereof, a refractive power of the fourth lens group G4 increases, and thus the incident angle to the imaging device decreases. Therefore, it is hard to influence shading. However, since a refractive power of the third lens group G3 decreases, a length of the whole lens system increases, and thus it becomes difficult to achieve downsizing.

As described above, according to the zoom lens system of this embodiment, there are arranged, in order from an object side, the first lens group G1 having the positive refractive power, the second lens group G2 having the negative refractive power, the aperture diaphragm St, the third lens group G3 having the positive refractive power, and the fourth lens group G4 having the positive refractive power. In the configuration of the zoom lens system, movement amounts of the lens groups and the aperture diaphragm St during zooming is optimized in combination with the appropriate conditional expression. Therefore, it is possible to downsize the whole lens while achieving a high variable power ratio. Furthermore, according to the imaging apparatus equipped with the zoom lens system of this embodiment, it is possible to downsize the whole apparatus while maintaining a favorable imaging performance of a high variable power ratio.

EXAMPLE

Hereinafter, specific numerical examples of the zoom lens system according to this embodiment will be described. In the following explanation, numerical examples will be collectively described.

FIGS. 5(A), 5(B) and 6 show specific lens data corresponding to the configuration of the zoom lens system shown in FIGS. 1(A), 1(B), and 1(C). Particularly, FIG. 5(A) shows basic lens data thereof, FIGS. 5(B) and 6 show the other data. In the column of the surface number Si in the lens data shown in FIG. 5(A), the number i represents the sequential number of an i-th (i=1 to 21) surface of the zoom lens system according to Example 1 that sequentially increases as it gets closer to the image side when an object-side surface of the most-object-side constituent component is regarded as a first surface. In the column of the radius of curvature Ri, there are shown values (mm) of the radius of curvature of an i-th surface from the object side to correspond to the reference sign Ri in FIG. 1(C). Likewise, in the column of the surface spacing Di, there are shown spaces (mm) on the optical axis between the i-th surface Si and the (i+1)-th surface Si+1 on the optical axis from the object side. In the column of Ndi, there are shown values of the refractive index at the d-line (587.6 nm) between i-th surface Si and the (i+1)-th surface Si+1 from the object side. In the column of vdj, there are shown values of the Abbe number at the d-line of the j-th optical element from the object side. In FIG. 5(A), as various data, there are shown values of the paraxial focal length f (mm) of the whole system, the angle of view (2ω) and the F number (FNO.) at the wide-angle end and the telephoto end.

In addition, in the zoom lens system according to Example 1, the aperture diaphragm St and lens groups are moved on the optical axis during zooming, and thus values of surface spacings D5, D11, D12, D17, and D19 on the anterior and posterior sides of the aperture diaphragm St and the respective lens groups are variable. In FIG. 5(B), as data of these surface spacings D5, D11, D12, D17, and D19 during zooming, there are shown those values at the wide-angle end, the intermediate and the telephoto end.

In the lens data in FIG. 5(A), the reference sign "*" noted on the left side of the surface number represents that the lens surface is aspheric. In the zoom lens system according to Example 1, both surfaces S16 and S17 of the single lens L33 in the third lens group G3 and both surfaces S18 and S19 of the positive lens L41 in the fourth lens group G4 are aspheric. In the basic lens data shown in FIG. 5(A), the numerical values of the radius of curvature near the optical axis are shown as radiuses of curvature of these aspheric surfaces.

FIG. 6 shows aspheric surface data in the zoom lens system according to Example 1. In the numerical values represented as the aspheric surface data, the reference sign "E" means that a numerical value following this is a "power exponent" having a base of 10 and that this numerical value, which has a base of 10 and is expressed by an exponential function, is multiplied by a numerical value before the "E". For example, "1.0E-02" means "$1.0 \times 10^{-2}$".

As regards the aspheric surface data of the zoom lens system according to Example 1, there are shown the respective coefficients $A_n$ and K used in an aspheric surface shape expression expressed by the following expression (A). Here, more specifically, Z represents a length (mm) of a perpendicular dropped from a point, which exists on an aspheric surface at a position of a height h from the optical axis, to a tangent plane to the vertex of the aspheric surface (a plane perpendicular to the optical axis).

$$Z = C \cdot h^2 / \{1 + (1 - K \cdot C^2 \cdot h^2)^{1/2}\} + \Sigma A_n \cdot h^n \quad (A)$$

(n=an integer not less than 3)

where

Z denotes a depth (mm) of an aspheric surface, h denotes a distance (a height, mm) from the optical axis to the lens surface, K denotes an eccentricity, C denotes a paraxial curvature equal to 1/R (R: a paraxial radius of curvature), and $A_n$ denotes an n-th order aspheric coefficient.

The zoom lens system according to Example 1 is expressed by appropriately and effectively using orders from $A_3$ to $A_{20}$ as an aspheric coefficient $A_n$.

Similarly to the zoom lens system according to Example 1 as described above, FIGS. 7(A), 7(B), and 8 show specific lens data corresponding to the configuration of the zoom lens system shown in FIGS. 2(A), 2(B), and 2(C) as Example 2. Similarly, FIGS. 9(A), 9(B), and 10 show specific lens data corresponding to the configuration of the zoom lens system shown in FIGS. 3(A), 3(B), and 3(C) as Example 3. Similarly, FIGS. 11(A), 11(B), and 12 show specific lens data corresponding to the configuration of the zoom lens system shown in FIGS. 4(A), 4(B), and 4(C) as Example 4.

Furthermore, also in the zoom lens systems according to Examples 2 to 4, the surfaces corresponding to the aspheric surfaces of the zoom lens system according to Example 1 are aspheric.

In FIG. 13, values regarding the above-mentioned conditional expressions according to the respective Examples are collectively shown. As shown in FIG. 13, the values of the respective Examples are all within the numerical range of the conditional expressions.

FIGS. 14(A) to 14(D) show spherical aberration, astigmatism, distortion (distortion aberration), and lateral chromatic aberration at the wide-angle end in the zoom lens system according to Example 1, respectively. FIGS. 15(A) to 15(D) show the same aberrations at the intermediate range, and FIGS. 16(A) to 16(D) show the same aberrations at the telephoto end. In the aberration diagrams, there are shown aberrations at the d-line (587.6 nm) which is set as a reference wavelength. In the spherical aberration diagram and the lateral chromatic aberration diagram, there are also shown aberrations at a wavelength of 460 nm and a wavelength of 615 nm. In the astigmatism diagram, the solid line represents aberration in the sagittal direction, and the dotted line represents aberration in the tangential direction. The FNO. represents a F number, and the ω represents a half angle of view.

Similarly, various aberrations in the zoom lens system according to Example 2 are shown in FIGS. 17(A) to 17(D) (wide-angle end), FIGS. 18(A) to 18(D) (intermediate range), and FIGS. 19(A) to 19(D) (telephoto end). Similarly, various aberrations in the zoom lens system according to Examples 3 and 4 are shown in FIGS. 20(A) to 25(D).

As can be seen from the respective value data and aberration diagrams mentioned above, in each example, there has been provided the zoom lens system capable of achieving reduction in size as a whole while having a high variable power ratio by satisfactorily correcting various aberrations at the respective zoom ranges.

Also, the invention is not limited to the embodiments and the examples, and may be modified to various forms. For example, the values of the radius of curvature, the surface spacing, and the refractive index in the lenses are not limited to the values shown in the numerical examples, and may have different values.

What is claimed is:

1. A zoom lens system comprising, in order from an object side:
    a first lens group having a positive refractive power;
    a second lens group having a negative refractive power;
    a stop;
    a third lens group having a positive refractive power; and
    a fourth lens group having a positive refractive power, wherein
    zooming is performed by moving at least the first lens group, the second lens group, the stop, and the third lens group along an optical axis,
    during the zooming, a position of the stop on the optical axis at a wide-angle end is closer to an image plane than that at a telephoto end,
    a space on the optical axis at the wide-angle end between the stop and the third lens group is larger than that at the telephoto end, and
    the following conditional expression is satisfied:

$$0.4 < (Pt - Pw)/fw < 0.9 \quad (1)$$

where fw denotes a focal length of the whole system at the wide-angle end,
        Pw denotes a distance on the optical axis at the wide-angle end between the image plane and the stop, and
        Pt denotes a distance on the optical axis at the telephoto end between the image plane and the stop.

2. The zoom lens system according to claim 1, wherein the following conditional expression is satisfied:

$$4.0 < f1/fw < 5.0 \quad (2)$$

where f1 is a composite focal length of the first lens group.

3. The zoom lens system according to claim 1, wherein the following conditional expression is satisfied:

$$0.2 < f3/f4 < 0.5 \quad (3)$$

where f3 denotes a composite focal length of the third lens group, and
        f4 denotes a composite focal length of the fourth lens group.

4. The zoom lens system according to claim 1, wherein during the zooming, the fourth lens group is moved so that a position of the fourth lens group at the telephoto end is closer to the image plane than that at the wide-angle end.

5. The zoom lens system according to claim 1, wherein
    the second lens group includes, in order from the object side,
        a negative lens of which an image-side surface is a concave surface being smaller in an absolute value of a radius of curvature than that of an object-side surface thereof,
        a biconcave lens, and
        a positive lens having a convex surface on the object side, and
    the negative lens, the biconcave lens and the positive lens of the second lens group are not cemented to each other.

6. The zoom lens system according to claim 1, wherein
    the third lens group includes, in order from the object side,
        a cemented lens formed by cementing (i) a positive lens of which an object-side surface is a convex surface being smaller in an absolute value of a radius of curvature than that of an image-side surface thereof and (ii) a negative lens having a concave surface on the image side, and
        a single lens having at least one aspheric surface.

7. The zoom lens system according to claim 1, wherein the fourth lens group is moved during focusing.

8. The zoom lens system according to claim 1, wherein the fourth lens group consists of a positive lens.

9. The zoom lens system according to claim 8, wherein the positive lens of the fourth lens group has at least one aspheric surface.

10. An imaging apparatus comprising:
    the zoom lens system according to claim 1; and
    an imaging device that outputs an imaging signal based on an optical image formed by the zoom lens system.

11. A zoom lens system comprising, in order from an object side:
    a first lens group having a positive refractive power;
    a second lens group having a negative refractive power;
    a stop;
    a third lens group having a positive refractive power; and
    a fourth lens group having a positive refractive power, wherein
    zooming is performed by moving at least the first lens group, the second lens group, the stop, and the third lens group along an optical axis, during the zooming, a position of the stop on the optical axis at a wide-angle end is closer to an image plane than that at a telephoto end, a space on the optical axis at the wide-angle end between the stop and the third lens group is larger than that at the telephoto end, and the following conditional expression is satisfied:

$$4.0 < ft/fw < 5.0 \qquad (2)$$

where f1 denotes a composite focal length of the first lens group, and fw denotes a focal length of the whole system at the wide-angel end.

12. An imaging apparatus comprising:

the zoom lens system according to claim 10; and an imaging device that outputs an imaging signal based on an optical image formed by the zoom lens system.

13. A zoom lens system comprising, in order from an object side:

a first lens group having a positive refractive power;

a second lens group having a negative refractive power;

a stop;

a third lens group having a positive refractive power; and a fourth lens group having a positive refractive power, wherein zooming is performed by moving at least the first lens group, the second lens group, the stop, and the third lens group along an optical axis, during the zooming, a position of the stop on the optical axis at a wide-angle end is closer to an image plane than that at a telephoto end, a space on the optical axis at the wide-angle end between the stop and the third lens group is larger than that at the telephoto end, and the following conditional expression is satisfied:

$$0.2 < f3/f4 < 0.5 \qquad (3)$$

where f3 denotes a composite focal length of the third lens group, and f4 denotes a composite focal length of the fourth lens group.

14. An imaging apparatus comprising:

the zoom lens system according to claim 13; and an imaging device that outputs an imaging signal based on an optical image formed by the zoom lens system.

\* \* \* \* \*